United States Patent [19]
Bose

[11] 3,789,093
[45] Jan. 29, 1974

[54] METHOD FOR ACCELERATING THE MOLDING CYCLE BY BLANKETING WITH DRY CARBON DIOXIDE GAS

[76] Inventor: Robert N. Bose, 3117 Roberts St., New Orleans, La. 70125

[22] Filed: Dec. 8, 1971

[21] Appl. No.: 205,823

Related U.S. Application Data

[63] Continuation-in-part of Ser. No. 8,350, Feb. 3, 1970, abandoned.

[52] U.S. Cl. ............... 264/37, 264/28, 264/85, 264/94, 264/97, 264/98, 264/237
[51] Int. Cl. ..................................... B29c 17/07
[58] Field of Search ..... 264/94, 98, 99, 37, 348, 97, 264/237, 85, 28

[56] References Cited
UNITED STATES PATENTS

| | | | |
|---|---|---|---|
| 3,662,048 | 5/1972 | Turner .................................. | 264/85 |
| 3,329,751 | 7/1967 | Slicker et al. ......................... | 264/85 |
| 3,044,118 | 7/1962 | Bernhardt et al. .................... | 264/85 |
| 3,065,501 | 11/1962 | Gasmire ................................ | 264/98 |
| 3,233,416 | 2/1966 | Rainwater et al. .................... | 264/99 |
| 3,520,020 | 7/1970 | Williams et al. ...................... | 264/94 |
| 3,510,548 | 5/1970 | Dicks et al. ........................... | 264/94 |
| 3,078,508 | 2/1963 | Martin, Jr. ............................. | 264/98 |

*Primary Examiner*—Robert F. White
*Assistant Examiner*—Jeffery R. Thurlow
*Attorney, Agent, or Firm*—Raymond E. Fidler

[57] ABSTRACT

Process of accelerating the molding cycle when using blow molding or injection molding machines including providing an enclosure around the molding area and supplying to said enclosure an atmosphere for blanketing the mold area with carbon dioxide gas to reduce the dew point in the mold cavities whereby the molds may be operated at a lower temperature without causing surface imperfections on the molded part. In other embodiments multi-station blow molding and injection molding machines include an enclosed mold area into which exhaust carbon dioxide from the molded articles is vented to maintain the dew point at a value below that of the ambient.

4 Claims, 7 Drawing Figures

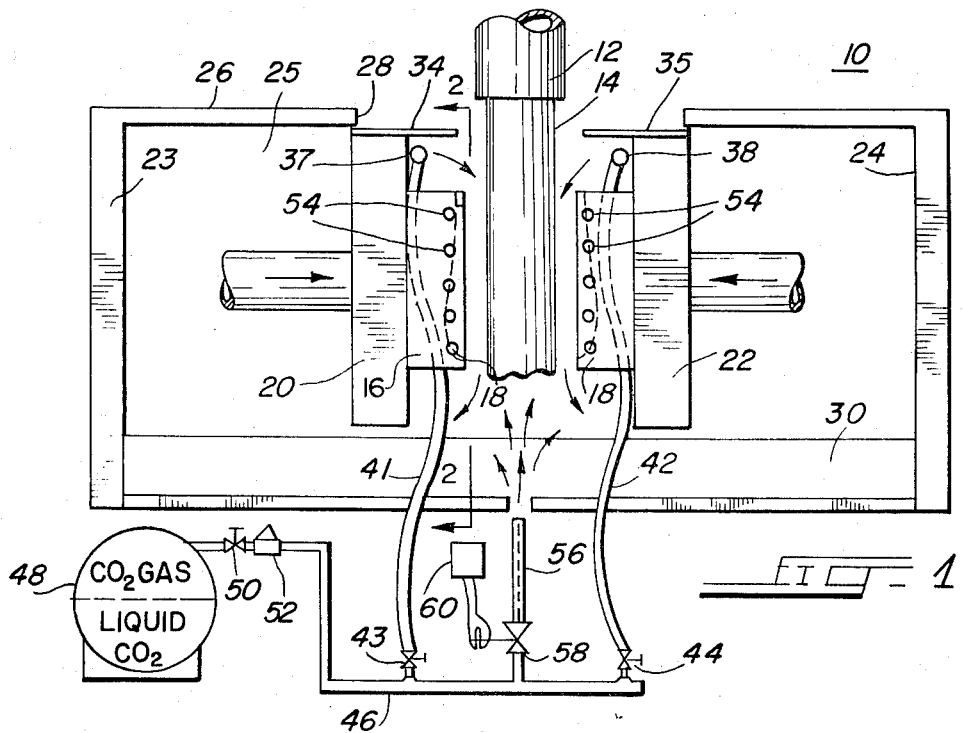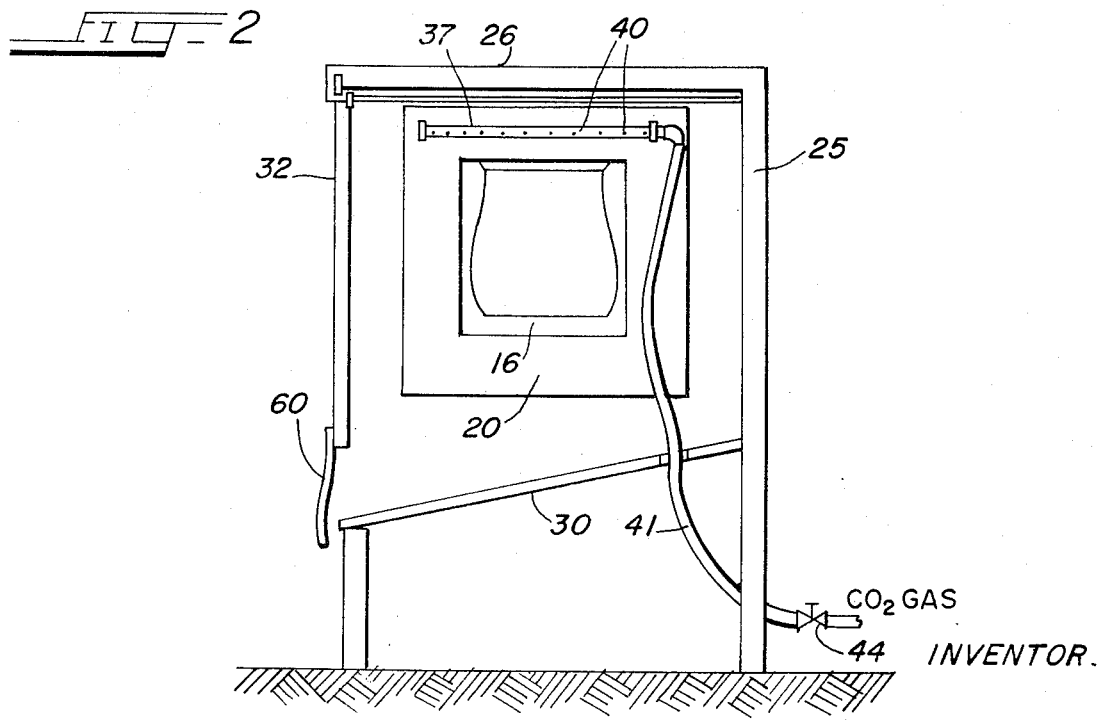

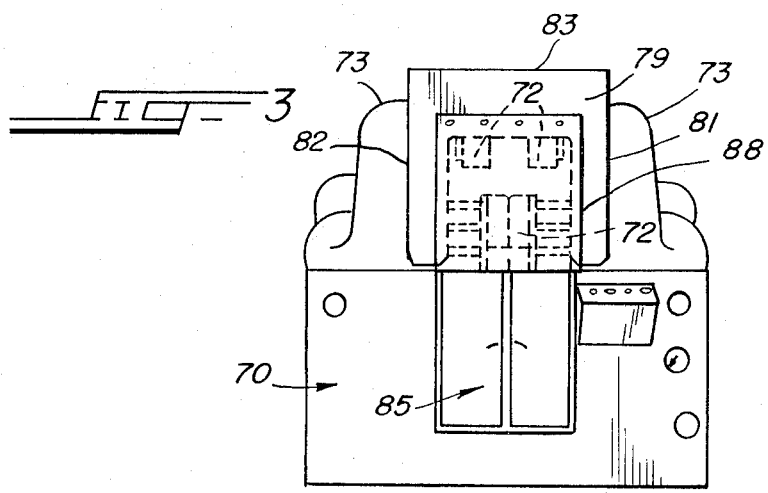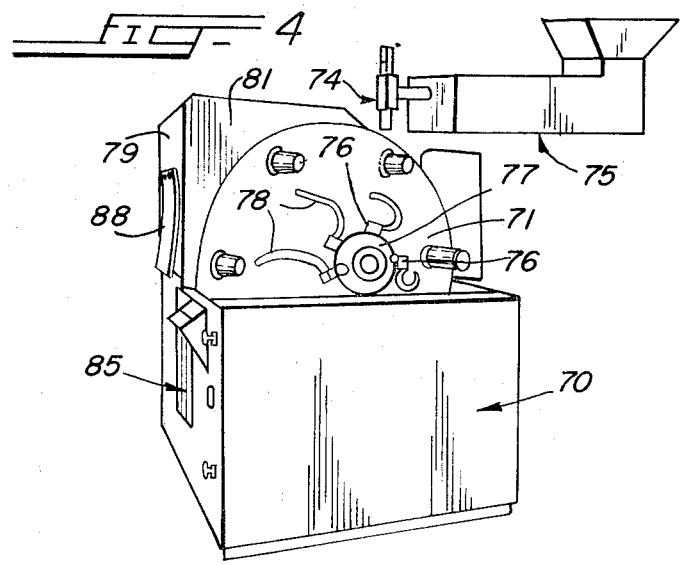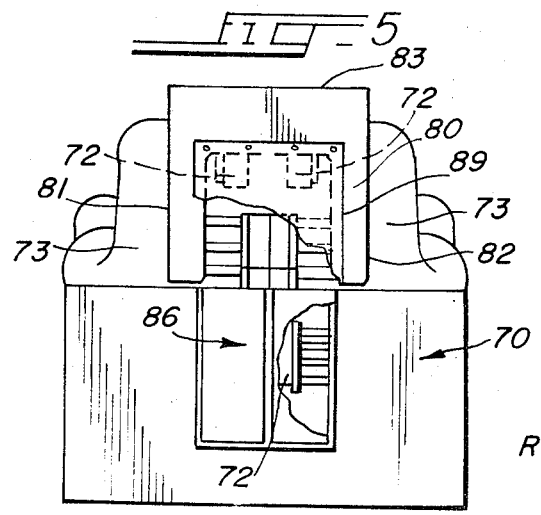

INVENTOR
ROBERT N. BOSE
ATTORNEYS

METHOD FOR ACCELERATING THE MOLDING CYCLE BY BLANKETING WITH DRY CARBON DIOXIDE GAS

This is a continuation-in-part of application Ser. No. 08,350 filed by me on Feb. 3, 1970, now abandoned.

The present invention relates to the art of molding plastic parts, and it relates more particularly to a method and apparatus utilizing dry carbon dioxide gas for accelerating the speed of the molding cycle by reducing the dew point in the mold area.

Hollow plastic parts are commonly blow molded by extruding the plastic into a hollow cylinder member called a parison, moving a pair of mold members into substantial mutual engagement to position the parison within a mold cavity defined by the mold members, inflating the parison into engagement with the surfaces of the mold cavity, chilling the mold members to set the plastic, then moving the mold members apart, and finally removing the molded part. If the mold members are cooled to a temperature less than the dew point of any vapor trapped in the mold between the plastic part and the surfaces of the mold cavity, water marks appear on the surface of the molded part giving it an appearance similar to that of an orange skin. Hence, the presence of water marks on a plastic part is commonly referred to as "orange peel effect." Inasmuch as the molds cannot be opened until the plastic has set to a sufficient extent to maintain its molded shape, the extent to which the molds can be chilled to cool the freshly molded part has been a limiting factor in attempts to speed up the molding cycle.

In order to permit cooling of the molds to lower temperatures than would otherwise be possible, entire plants or work areas have been air-conditioned. Not only is this expensive but it has provided only small improvement in the mold cycle except in very warm, humid climates as in some parts of the southern United States. It would be desirable, therefore, to provide a new and improved method and means for enabling the use of cooler molds in a plastic blow molding operation whereby faster mold cycles and improved molding efficiency could be achieved.

A similar problem exists with injection molded parts where the molds cannot be cooled to below ambient temperature without causing condensation of water vapor on the mold surfaces. It would, however, be desirable to cool such molds below ambient temperature in order to accelerate the mold cycle in many applications.

An object of this invention is to provide a new and improved method of decreasing the time required to cool a freshly molded plastic part.

Another object of this invention is to provide new and improved means for reducing the dew point in the mold area of a plastic molding machine.

A further object of the present invention is to provide new and improved means for reducing the dew point of a vapor contained in the mold of a blow molding or injection molding machine.

Briefly, the above and further objects may be realized in accordance with the present invention by blanketing the mold area with dry carbon dioxide gas or vapor which has a dew point considerably below that of the ambient air and cooling the molds to a temperature substantially below ambient temperature but greater than the dew point of any vapor trapped in the mold.

Further objects and advantages and a better understanding of the present invention may be had by reference to the following detailed description taken in connection with the accompanying drawings wherein:

FIG. 1 is a vertical, cross-sectional view, in schematic form, of a blow molding machine embodying the present invention;

FIG. 2 is a cross-sectional view taken along the line 2—2 of FIG. 1;

FIG. 3 is a front elevational view of a six-station rotational blow molding machine embodying the present invention;

FIG. 4 is a side elevational view of the machine of FIG. 3;

FIG. 5 is a rear elevational view of the machine of FIG. 3;

Figure 6:
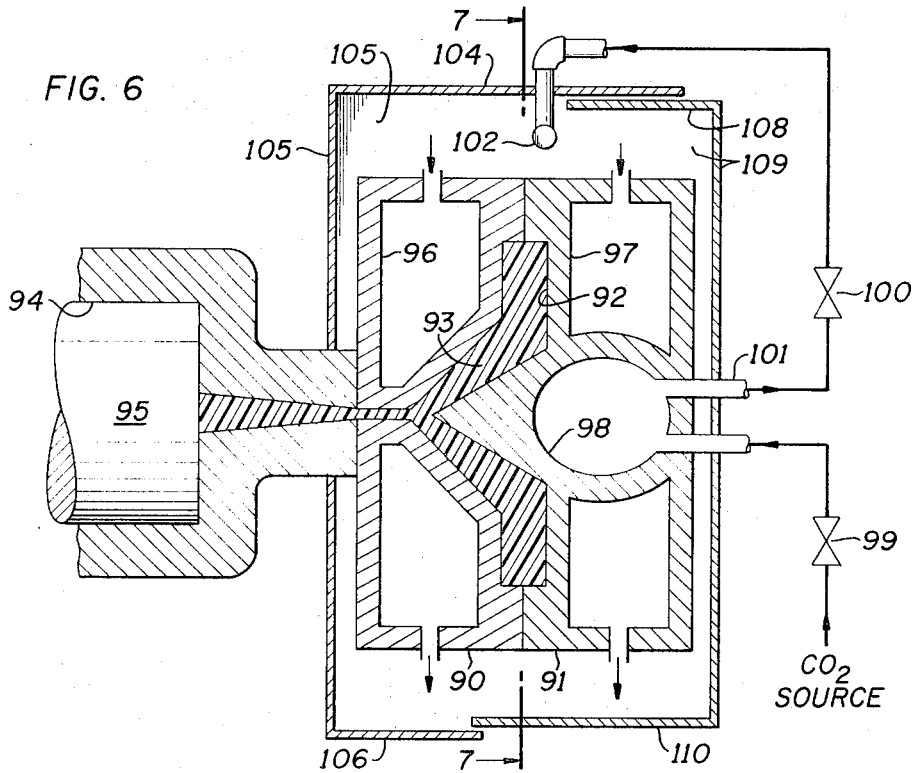
FIG. 6 is a cross-sectional elevation, in generally schematic form, of an injection molding station embodying the present invention.

Referring now to the drawings and particularly to FIG. 1 thereof, there is shown a plastic blow molding machine 10 which comprises an extruding head 12 through which a hot plastic parison 14 is extruded between a pair of mold halves 16 and 18 respectively mounted for reciprocal movement on a pair of platens 20 and 22. The mold area is enclosed by the frame of the machine which includes sidewalls 23 and 24, a rear wall 25 and a top 26. The top 26 is provided with a central opening 28. The bottom of the mold area is defined by a slanted bottom member 30 and the front of the machine is defined by a pair of sliding doors 32, one of which is best known in FIG. 2. A pair of shields 34 and 35 are respectively secured to the tops of the platens 20 and 22 to better enclose the mold area.

In order to blanket the mold area with dry carbon dioxide gas so as to lower the dew point of the gases and vapors located therein, a pair of tubes 37 and 38 are respectively secured to the platens 20 and 22 at a short distance above the molds 16 and 18. These tubes 37 and 38 are provided with a plurality of orifices 40 which direct carbon dioxide gas into the space between the mold members. On end of each of the tubes 37 and 38 is plugged off and the other ends are respectively connected by flexible tubing 41 and 42 to a pair of adjustable needle valves 43 and 44 which are in turn connected to a conduit 46. Carbon dioxide gas or vapor is supplied to the line 46 from a conventional carbon dioxide tank 48 through a control valve 50 and a pressure regulator 52 which maintains the flow through the line 46 constant as the pressure in the tank 48 decreases.

It is desired that the temperature of the carbon dioxide vapor which is emitted from the tubes 37 and 38 be substantially the same as ambient temperature, and under normal circumstances this is the case inasmuch as the tank 48 is located outside of the building at a substantial distance from the molding machine 10 whereby the $CO_2$ gas flowing through the line 46 is at about ambient temperature when it reaches the molding machine. If necessary, however, auxiliary heating means (not shown) may be used or the line 46 may extend in proximity to the high temperature portions of the machine.

In order to control the temperature of the mold members 16 and 18 and quickly cool them after the parison has been inflated, cold water is pumped through passageways 54 provided in the molds 16 and 18.

When relatively large parts are being molded, there is a tendency for the lower end of the parison to close off unless some provision is made to keep it open. For this purpose there is provided in accordance with the present invention a nozzle 56 which is supplied with carbon dioxide gas from the line 46 through a solenoid valve 58 whose operation is controlled by a timer 60. Accordingly, the valve 58 is opened at a predetermined time in the mold cycle as the parison 14 is being extruded to direct carbon dioxide gas into the lower end of the parison to maintain it in an open condition. In order to conserve carbon dioxide gas, the valve 58 is closed when the molds 16 and 18 move into engagement with the parison 14 and remains closed until the next parison 14 is partially extruded.

At the beginning of the molding cycle, the platens 20 and 22 are in the illustrated retracted position and while a plastic parison 14 is being extruded from the head 12, carbon dioxide gas is supplied through the orifices 40 to the mold area. Inasmuch as carbon dioxide gas is one and one-half times more dense than air, it settles throughout the mold area forcing most of the ambient air out of the machine through the various openings which are provided therein. In this regard, it will be apparent that the mold area is not hermetically sealed whereby the air which is displaced from the mold area by the carbon dioxide gas may flow out of the machine thereby to reduce the dew point in the mold area and eliminate water marks on the molded parts.

As the parison 14 moves downwardly, the timer 60 or another suitable mechanism such as a photoelectric eye opens the valve 58 whereby carbon dioxide gas from the nozzle 56 blows upwardly into the lower end of the parison thereby to maintain the lower end of the parison 14 open and also to assist in removing ambient air from the mold area. After the platens have moved the mold halves 16 and 18 into mutual engagement, pressurized gas or vapor is applied to the inside of the parison by means well known in the art to expand the parison into engagement with the mold surfaces. Since some vapor is trapped between the mold surface and the part, it is most important that the mold not be cooled below the dew point of this vapor until the plastic has set, otherwise the "orange peel" effect results. In normal practice, once the parison has been inflated into engagement with the mold cavity, a cooling liquid such as water is passed through the molds 16 and 18 to rapidly chill the molds and to rapidly chill the freshly molded plastic part. Once the part has set, the platens 20 and 22 are moved away from one another and the part falls onto the inclined shelf 30 at which point it may be removed by the operator through a flexible Telfon curtain 60 hanging from the bottom of the sliding doors 32. It has been found that when using a carbon dioxide gas which is relatively dry and has a dew point of approximately minus 100°F., the dew point of the atmosphere in the mold cavity which results from the combination of the carbon dioxide vapor and the ambient air is reduced by about 15 to 20 degrees of relative humidity thereby allowing the use of mold temperature at comparably lower values without causing "orange peel" marks on the molded parts.

The use of liquid carbon dioxide as an internal coolant is commonly used within the blow molding industry. One such system is described in U.S. Pat. No. 3,065,501 to Gasmire. Likewise, where conditions dictate, carbon dioxide vapor may be used as the blowing medium in place of air. Such a system is disclosed in my copending application Ser. No. 848,625, filed Aug. 8, 1969, now U.S. Pat. No. 3,661.483. In most blow molding machines, the areas around the moving parts are protected by safety shields made of expanded metal grilles. Moreover, the air used for blowing is exhausted to the surrounding atmosphere. However, in order to take advantage of the benefits of this invention both conditions can be easily modified.

Referring now to FIGS. 3, 4 and 5, there is shown in somewhat schematic form a six-station, rotary wheel blow molding machine of the type sold by the Beloit Plastics Machinery Company of Downington, Pa. As its principal components, this machine comprises a base portion 70 housing an electric drive motor (not shown) and the main control elements for rotating a pair of spaced apart turret plates or wheels 71. In FIG. 4, one of a pair of upper access covers 73 best shown in FIGS. 3 and 5 has been removed to show one of the circular plates 71 and some of the components which are mounted on the outer side thereof. Between the two plates 71 are mounted six sets of platens on which molds 72 are fixedly mounted for reciprocation between closed and open positions as the turret rotates. This machine includes a single parison extruding head 74 fed by a screw type extruder and hopper 75. The head is positioned directly above the one o'clock position of the turret as viewed in FIG. 4. The turret rotates in a clockwise direction as viewed in FIG. 4 and the molds are open as they approach the parison and then close thereon as they move through the one o'clock position. Thereafter, air or a mixture of air and carbon dioxide gas is fed into the parison under control of the associated one of the six valves 76 shown mounted on the hub as viewed in FIG. 4. After the parison has been inflated into conformity with the mold surfaces, carbon dioxide liquid is injected into the molded part to cool it. The article is then vented through the hub valve 77 and the valve 76. As thus far described, this type of blow molding machine, except for the use of carbon dioxide for blowing the parison, is well known in the industry, having been widely used for many years. In the past, the exhausted gas from the molded articles has been vented to the atmosphere through the valves 76.

In accordance with the present invention the gas being exhausted through the valves 76 is returned to the mold area by means of a plurality of hoses 78 which extend through suitable holes in the turret plate 71 and connect to the six outlets from the valves 76. Inasmuch as carbon dioxide is preferably used both to blow the parison and to cool it, this exhaust gas has a substantially lower dew point than the ambient. Even where carbon dioxide is used only to cool the article, the exhaust gas has a lower dew point than the ambient and its return to the mold area permits the faster operation of the machine. Best results are achieved, however, where carbon dioxide is also used to blow the part.

In order to retain this carbon dioxide gas in the mold area, in accordance with the present invention the entire mold area is enclosed. As shown, imperforate front and rear walls 79 and 80 and side and top walls 81, 82 and 83 are provided. In addition, two sets of doors 85 and 86 are provided at the front and rear of the base 70 to permit access to the mechanism located therein. In the prior art machine, the areas covered by these doors are open. The front and rear walls 79 and 80 are provided with large access openings covered by hanging, flexible curtains 88 and 89 to permit removal of the molded articles and access to the molds while substantially confining the carbon dioxide gas within the mold area.

There is thus provided in accordance with this aspect of the present invention a method of using the exhaust gas from the blow-molded articles to reduce the dew point of the atmosphere in the mold area. Rotational blow molding machines of the type described hereinabove ordinarily have metal grilles more or less enclosing the mold area. Such machines may be modified to use the method of the present invention by simply covering the grilles with fiberboard or Plexiglass, the latter being transparent to permit visual inspection of the molding operation, and feeding carbon dioxide into this enclosure. Preferably, for reasons of economy, where carbon dioxide gas is used in the molding operation for cooling, for blowing or for both purposes the gas exhausted from the molded articles is vented into the mold area. Where necessary, as for example where carbon dioxide is used only for cooling, additional carbon dioxide gas may be supplied directly to the mold area to supplement that exhausted from the molded articles.

Figure 7:
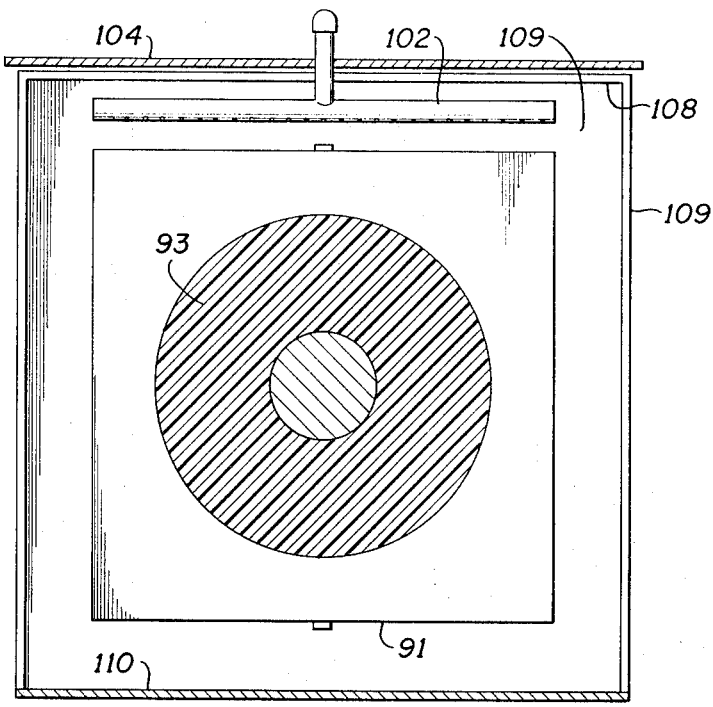
FIG. 7 is a cross-sectional view of the molding station of FIG. 6 taken along the line 7—7 thereof.

In FIGS. 6 and 7 there is shown an injection molding station adapted to use the present invention for providing an atmosphere of dry carbon dioxide gas in the mold cavity when the hot fluid plastic is injected therein. It will be understood by those skilled in the art that various parts of the molding machine, such as the frame, the platens, the hydraulic drives, the controls and the like are not shown. Moreover, because of the many different injection molding machine designs to which the present invention is applicable, the molding station of FIGS. 6 and 7 is shown in schematic form only.

Referring now to FIG. 6, a pair of generally hollow mold members 90 and 91 define therebetween a mold cavity 92 into which a hot, fluid plastic material 93 is injected from a cylinder 94 by a piston 95. The mold member 90 is stationary and the mold member 91 is reciprocably mounted for axial movement between the molding position as shown and a part unloading position where it is retracted away from the mold 90.

The molds 90 and 91 are provided with cooling chambers 96 and 97 respectively, through which a cooling liquid such as water is passed in order to cool the molded part 93 to permit removal thereof from the mold cavity. The mold member 91 is also provided with an auxiliary cooling chamber 98 into which liquid carbon dioxide from a suitable source is supplied through a control valve 99. The liquid carbon dioxide evaporates in the chamber 98 to extract a substantial amount of heat from the adjoining parts of the mold 91 and thus from the portions of the plastic part adjacent thereto. Upon completion of the injection cycle, cold water is fed to the chambers 96 and 97 and the valve 99 is opened to supply carbon dioxide to the chamber 98. When the part 93 is sufficiently cool to permit removal thereof from the mold cavity 92 without damage thereto, the mold 91 is retracted away from the mold 90 and the part 93 is extracted by suitable means such as push pins (not shown). The mold 91 is then moved against the mold 90 and the cycle is repeated.

In accordance with the present invention, the carbon dioxide gas contained in the auxiliary cooling chamber 98 is returned to the mold area while the molds 90 and 91 are separated and the part 93 has been removed. To this end, a control valve 100 is connected in an outlet line 101 from the chamber 98 to an orificed tube 102 mounted above the parting line of the molds 90 and 91. The tube 102 may be similar in construction to the tubes 37 and 38 in the embodiment of the invention shown in FIGS. 1 and 2. When the valve 100 opens, the dry carbon dioxide gas in the chamber 98 is discharged into the mold area so that when the molds 90 and 91 subsequently close, the mold cavity 92 is substantially filled with dry carbon dioxide which does not condense on the relatively cold mold surfaces.

As described hereinabove, it is preferable to substantially enclose the entire mold area with a surrounding structure which minimizes the flow of ambient air into the mold area and the flow of carbon dioxide out of the mold area. Accordingly, an enclosing structure including a top sheet 104, sidewalls 105 and a bottom wall 106 forming an open box-like housing is fixedly mounted relative to the stationary mold member 90. A similar structure including a top wall 108, sidewalls 109 and a bottom wall 110 is mounted to the movable mold member 91. Ordinarily, a chute is provided below the molds for carrying the parts to a conveyor belt or the like, and where such is provided it is desirable to provide a curtain over such chute to minimize the loss of carbon dioxide from the mold area.

While the present invention has been described in connection with particular embodiments thereof, it will be understood that many changes and modifications may be made without departing from the true spirit and scope of the present invention. It is intended, therefore, to cover all such changes and modifications.

What is claimed is:

1. A method of accelerating the molding cycle in a plastic molding operation wherein a hot plastic material is placed in a mold cavity defined by a plurality of relatively movable mold parts and forced against the interior mold surfaces to form a plastic part, which mold parts are then moved apart to permit removal of the part, comprising the steps of
substantially enclosing the space immediately around said mold parts, and
supplying dry carbon dioxide gas to the enclosed area to maintain an atmosphere of dry carbon dioxide gas within said area so as to reduce the dew point of the atmosphere in said cavity and permit cooling of the mold parts to temperatures lower than the ambient temperature without causing water marks on the plastic part.

2. A method according to claim 1 wherein carbon dioxide is supplied to the interior of said plastic part during the molding operation, comprising the further step of
returning at least a portion of the carbon dioxide gas exhausted from the interior of said part to the enclosed space around said mold parts.

3. A method according to claim 1 wherein the hot plastic is injected into said mold cavity and carbon dioxide is supplied to passageways within the mold parts to cool said mold parts and the plastic part, comprising the step of returning at least a portion of the carbon dioxide gas exhausted from the mold passageways to said enclosed area.

4. A method of blow molding a plastic part comprising the steps of providing an enclosure around a plurality of relatively movable mold parts defining a mold cavity therein, forming a plastic parison, positioning said mold parts over said parison so that said parison is located within said mold cavity, injecting carbon dioxide into said parison, and thereafter venting the gas from the molded part into the space within said enclosure exteriorly of the mold parts to reduce the dew point in said mold cavity during the subsequent molding operation.

* * * * *